United States Patent [19]

Blaushild et al.

[11] Patent Number: 4,797,247

[45] Date of Patent: Jan. 10, 1989

[54] THERMAL INSULATION OF NUCLEAR REACTOR

[75] Inventors: Ronald M. Blaushild, Penn Hills; Leonard R. Golick, Level Green; Stephen L. Samluk; Richard E. Tome, both of Murrysville, all of Pa.

[73] Assignee: Westinghouse Electric Corp., Pittsburgh, Pa.

[21] Appl. No.: 510,491

[22] Filed: Jul. 5, 1983

[51] Int. Cl.⁴ ............................................. G21C 11/00
[52] U.S. Cl. .................................... 376/289; 220/283; 376/262
[58] Field of Search ............... 376/260, 262, 263, 287, 376/289; 52/248; 220/283, 449, 452

[56] References Cited

U.S. PATENT DOCUMENTS

| | | |
|---|---|---|
| 669,767 | 3/1901 | Schlichter . |
| 1,021,718 | 3/1912 | Graft . |
| 1,102,201 | 6/1914 | Nafziger . |
| 1,232,604 | 7/1917 | Quick ..................... 52/248 |
| 2,806,820 | 9/1957 | Wigner . |
| 2,807,727 | 9/1957 | Fermi et al. ..................... 376/287 |
| 3,159,550 | 12/1964 | Laming . |
| 3,235,463 | 2/1966 | Sankovich ..................... 376/289 |
| 3,413,196 | 11/1968 | Fortescue et al. . |
| 3,836,429 | 9/1974 | Frisch et al. . |
| 3,963,563 | 6/1976 | Beine et al. ..................... 376/287 |
| 3,963,936 | 6/1976 | Lowe ..................... 376/287 |
| 4,174,596 | 11/1979 | Deibele . |
| 4,303,553 | 12/1981 | Aoki et al. ..................... 376/289 |
| 4,432,932 | 2/1984 | Jacobson ..................... 376/260 |

FOREIGN PATENT DOCUMENTS 0034094 8/1981 European Pat. Off. ............ 376/260

Primary Examiner—Deborah L. Kyle
Assistant Examiner—Richard W. Wendtland
Attorney, Agent, or Firm—H. Diamond

[57] ABSTRACT

A nuclear reactor having a remotely removable and replaceable thermal insulating shield for the head. Access permitting removal and replacement of the head is thus afforded.

The thermal insulating shield includes a vertical frame of insulating material of polygonal transverse cross section encircling the head. A top panel of insulating material is mounted on the top of the frame pivotal by remote actuation between a horizontal position and a retracted position which may be vertical. In the horizontal position, the panels mate to provide thermal shielding for the head.

13 Claims, 6 Drawing Sheets

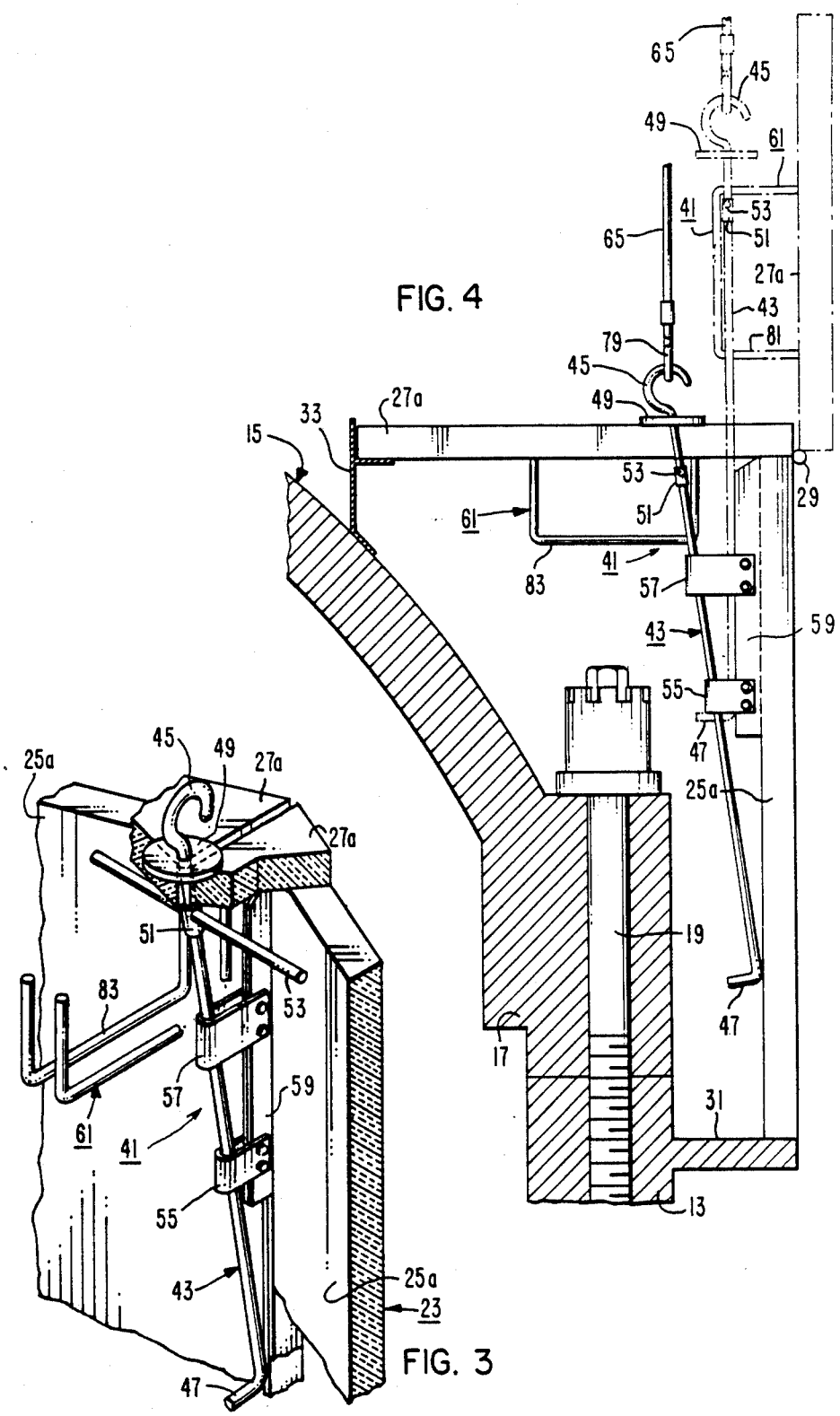

4,797,247

THERMAL INSULATION OF NUCLEAR REACTOR

CROSS-REFERENCE TO RELATED APPLICATION

Application Ser. No. 510,491, filed concurrently herewith to Ronald M. Blaushild et al. for "Thermal Insulation of Nuclear Reactor", assigned to Westinghouse Electric Corporation is incorporated herein by reference.

BACKGROUND OF THE INVENTION

This invention relates to nuclear reactors and has particular relationship to such reactors including a thermal insulating shield. A nuclear reactor, particularly of the pressurized light-water type, has a pressure vessel including a generally cylindrical body and a dome-shaped head. The head is removable for refueling and other services. To conserve the thermal energy developed in the reactor, it is provided with a thermal shield. The shield extends about the body and over the entire closure head. Part of the shield that covers the top of the head is removable as part of the head. Other parts of the shield for the head must be removed to afford access to unscrew the studs to remove the head.

In accordance with the teachings of the prior art, the thermal insulation on the head includes a plurality of mating pads which extend over at least a portion of its outer surface. When the head is to be removed, the pads are separately removed from the head. The removal is effected manually usually by lifting the pads one-by-one from the head. This process is time consuming and requires that personnel be exposed to radiation.

It is an object of this invention to overcome the drawbacks and disadvantages of the prior art and to provide thermal insulation for the head of a nuclear reactor which shall be readily removable by remote control, without exposure of personnel to radiation, to permit removal or replacement of the head.

SUMMARY OF THE INVENTION

In accordance with this invention, a nuclear reactor is provided whose head is thermally insulated by a shield including a frame insulating material from which panels of insulating material extend pivotally. The panels are pivoted at or near the top of the frame between a generally horizontal position and a retracted position. In the horizontal position, the panels mate and shield the head thermally. In the retracted position, the panels permit removal or replacement of the head. The panels are pivoted between the two positions by a mechanism or linkage which is actuable remotely.

BRIEF DESCRIPTION OF THE DRAWINGS

For a better understanding of this invention, both as to its organization and as to its method of operation, together with additional objects and advantages thereof, reference is made to the following description, taken in conjunction with the accompanying drawings, in which:

FIG. 3 is a fragmental view in isometric showing the mechanism for moving the panels and frame between their thermal shielding positions and the retracted position in which they afford access for removal or replacement of the head;

FIG. 4 is a fragmental veiw partly in longitudinal section showing how this mechanism actuates the panels between the horizontal and retracted positions.

DESCRIPTION OF THE PREFERRED EMBODIMENTS

Figure 1:
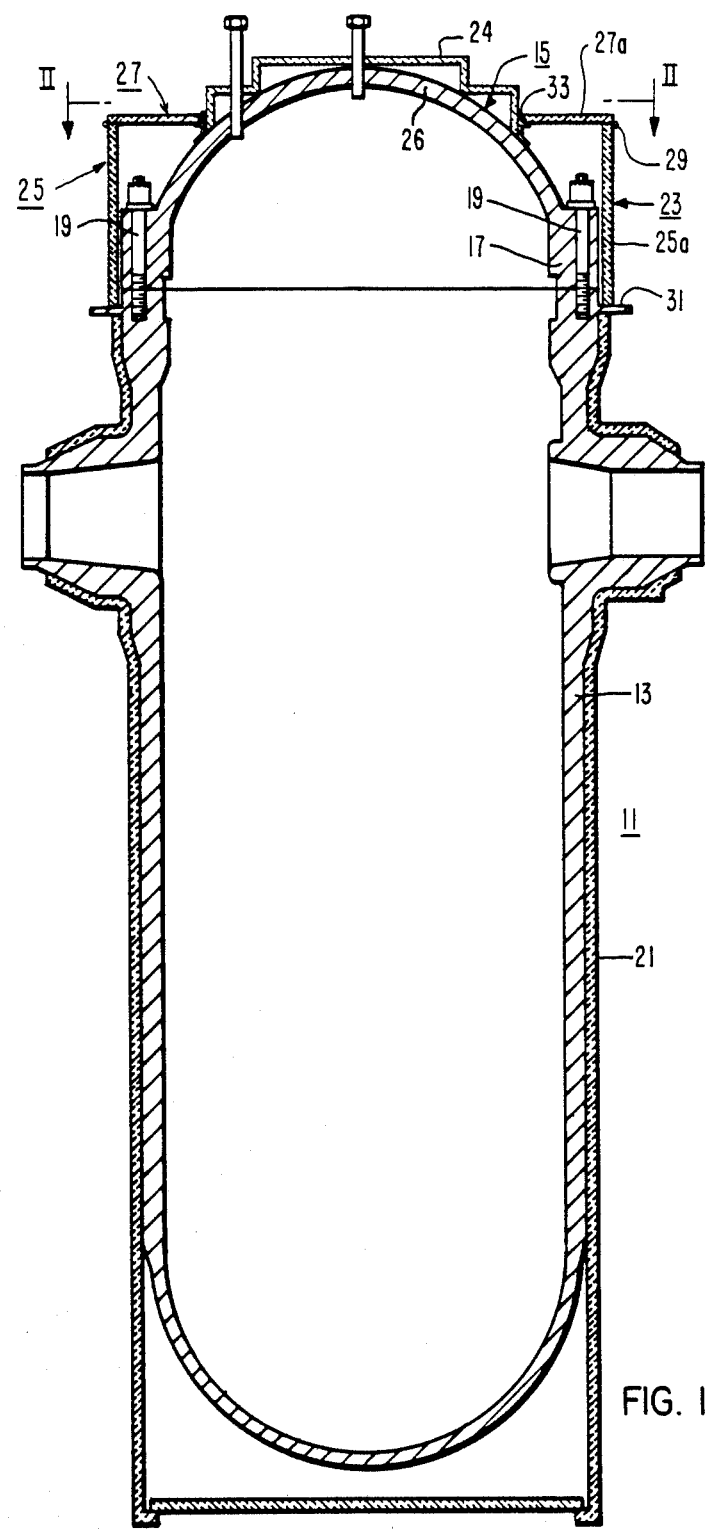
FIG. 1 is a view in longitudinal section of a nuclear reactor in accordance with this invention.

The apparatus shown in the drawings is a reactor 11 including a pressure vessel having a body 13 and a head 15. The body 13 is generally circularly cylindrical terminating at the bottom in a spherical bowl. The head 15 is dome-shaped and is provided at its base with an annular flange 17. The head 15 is secured to the body 13 by studs 19 which compress sealing O-rings (not shown) between the closure-head flange 17 and the top of the body 13. The control rods, instrument parts and the like (not shown in detail) extend from the top of the head 15.

The body 13 and head 15 are enclosed in thermal insulating shields 21, 23 and 24. The shields 21, 23 and 24 could be composed of a material such as Ricardo Neutron Shielding sold by Richardson, Battery Parts Division, Melrose Park, Ill. 60160. In this case, the shields would reflect neutrons as well as serving as a thermal shield. The shielding can also be purely neutron reflecting. The shield 24 covers the top 26 of the head and need not be removed to afford access to remove the head. The shield 23 embodies a unique feature of this invention. The thermal shield 23 includes a frame 25 of thermal insulating material. Near or at the top of the frame 25, a plurality of panels 27 of thermal insulating material are mounted pivotal each on a hinge 29. The frame 25 is of polygonal transverse cross-section with a panel 27a pivotally mounted on hinges 29 near or at the top of each side 25a of the frame. Typically, the frame 25 may be of octagonal transverse cross-section. Each unit including a side 25a and a panel 27a may be separate from the other units 25a–27a or several or all sides 25a of the frame 25 may be joined. The frame 25 and the panels 27 may be composed of insulating board as shown. In this case, the frame 25 must have sufficient strength and rigidity to support the panels 27 notwithstanding the high temperature of the head 15 during normal operation. The frame 25 and/or the panels 27 may also be formed of opposite metallic plates defining between them a pocket within which thermal insulating material is disposed. The frame 25 and/or the panels 27 may be laminated structures formed of a plurality of overlaid insulating board. Instead of being of polygonal section, the frame 25 may be of circular transverse section with the panels 27 suitably shaped, i.e., curved, at their outer ends so that they are adapted to be pivotally mounted on the frame.

Figure 2:
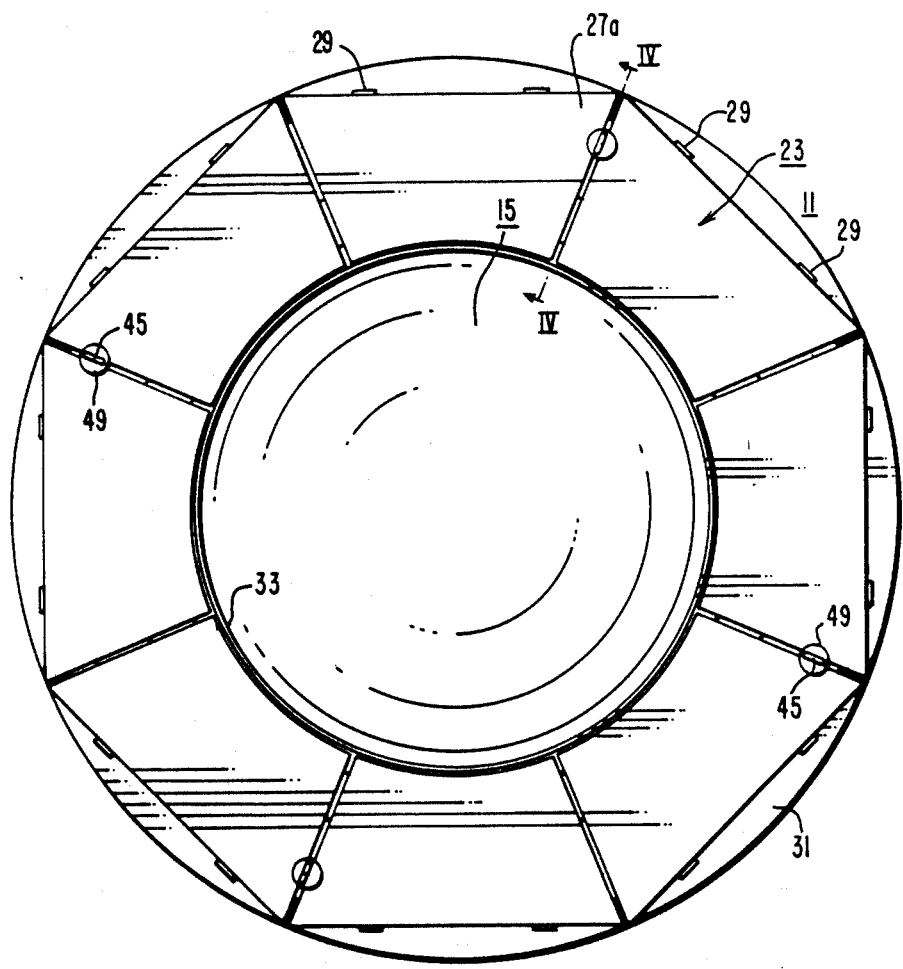
FIG. 2 is a plan view of this reactor taken in the direction of the arrow II of FIG. 1.
Figure 5:
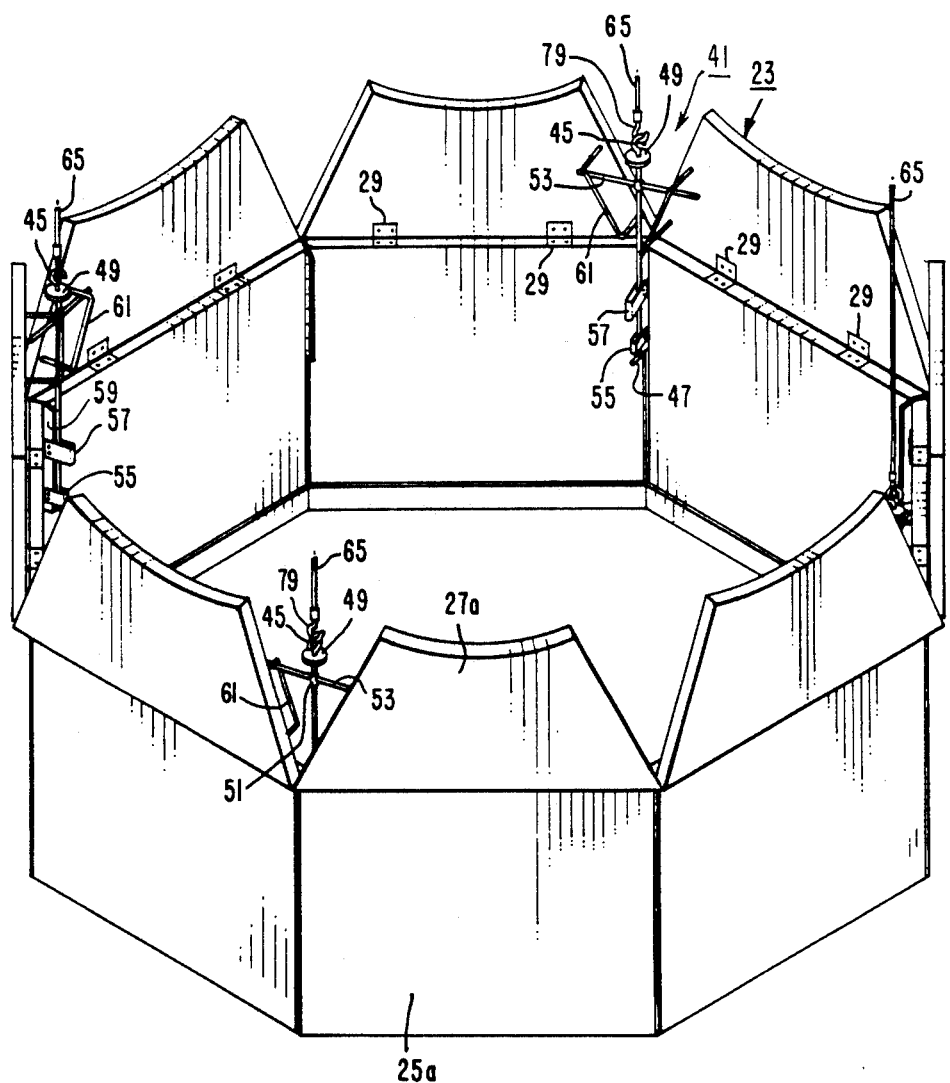
FIG. 5 is a view in isometric showing the thermal shield for the head with the panels in retracted position with the reactor head removed in the interest of clarity.
Figure 6:
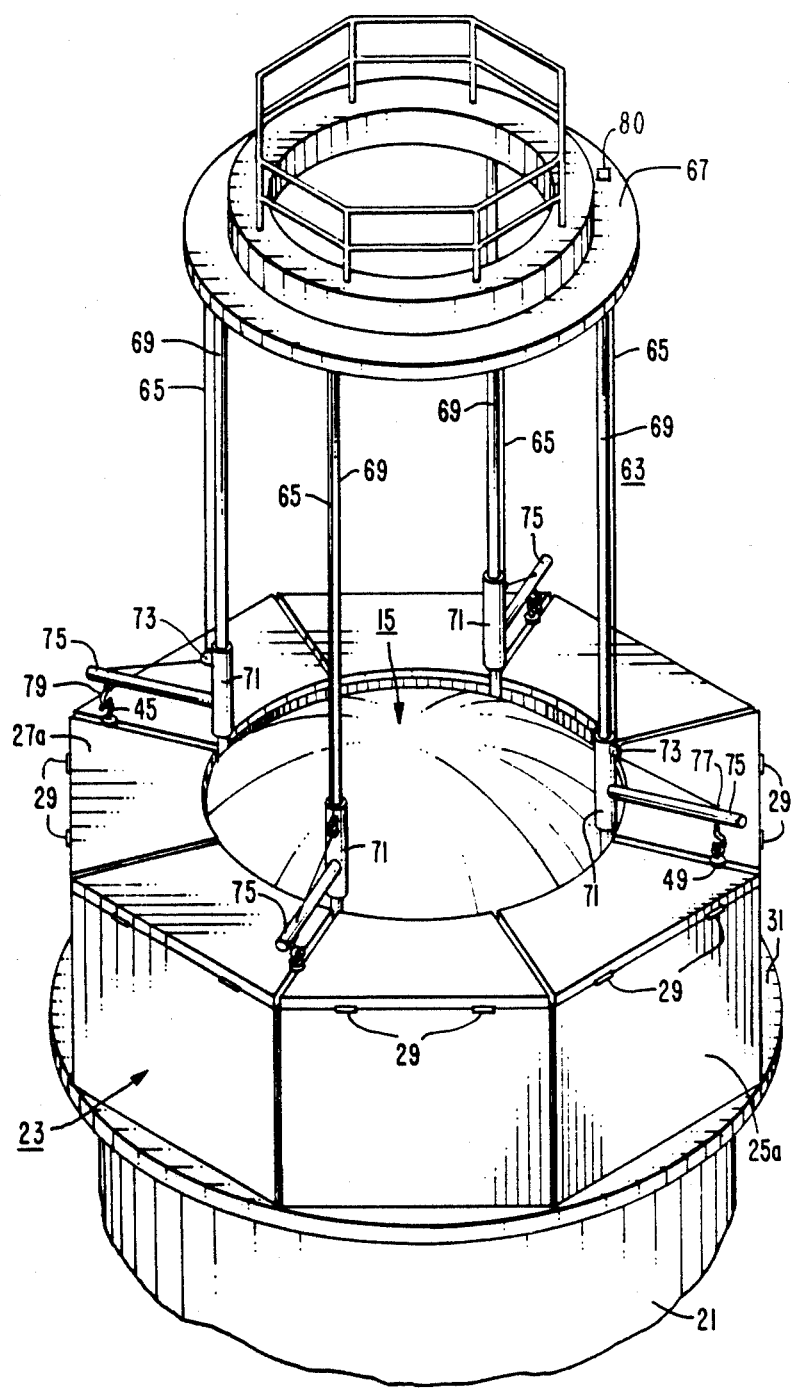
FIG. 6 is a fragmental view in isometric, with the head-shield insulator in shielding position, showing the actuating means for the moving mechanism.

At its lower end, the frame 25 is supported on a flange 31 extending from the body near its top. The panels 27 are pivotal from a generally horizontal position (FIGS. 1, 3, 4, 6) to a retracted position (FIGS. 3, 5, 7) in which they are generally vertical or at a relatively small angle to the vertical. Each panel 27a is of generally trapezoidal shape so that when the panels are in a horizontal position, they mate to form a substantially closed thermal shield over the portion of the head over which they extend (FIGS. 2, 6). In the horizontal position, the inner ends of the panels 27 are supported on a bracket 33 mounted on the head.

For raising or lowering the thermal shield 23, a plurality of mechanisms or linkages 41 (FIGS. 3, 4, 5) are provided. The mechanisms 41 are disposed so that a single mechanism operates on adjacent sides 27a of the shield 23. Each mechanism 41 (FIGS. 3, 4) includes a rod 43 having a hook 45 at its upper end. A finger 47 projects from the rod 43 at its lower end. Below the hook 45, a circular plate 49 is mounted on the rod 43 and below the plate 49 a sleeve 51 is secured to the bar. The sleeve 51 and bar 43 are penetrated by cross rod 53. The rod 43 is passed between the adjacent panels 27a with the plate 49 above the panels and the sleeve 51 and cross rod 53 below the panels. The rod 43 is moveable in U-shaped guides 55 and 57 suspended from a bar 59 connected to the adjacent sides 25a at their joint. Guide 55 is shorter than guide 57 to accommodate the bar 43 which, when panels 27a are in a horizontal position, is at an angle to the vertical. In moving the panels 27a from the horizontal to the retracted position, the rod 43 slides along the walls of the guides 55 and 57 which function as cam surfaces. The cross bar 53 is positioned to engage a pair of parallel U-shaped members 61 suspended side-by-side each from one of the adjacent panels 27a (FIG. 4). The members 61 function as a cam with the cross rod 53 as a cam follower.

The apparatus 63 (FIGS. 6 and 7) for raising or lowering the thermal shield 23 includes a plurality of cable 65 which extend from a rig (not shown) on the seismic support platform 67. The rig is driven by a motor (not shown) in turn pulling the cables 65 upwardly or downwardly. The motor is energized when receiver 80 on the platform 67 is enabled. The platform 67 is supported on columns 69, each provided with a sleeve 71 slideable along the column. Each sleeve 71 has a pulley 73 through which a corresponding cable 65 passes. A cantilever rod 75 extends from each sleeve 71. Each cantilever rod 75 has a hole 77 (FIG. 7) near its outer end through which the cable 65 passes. Each cable 65 has a loop 79 (FIG. 4) at its lower end which engages the hook 45 extending from a bar 43.

In normal operation, the thermal shield 23 is in the shielding position (FIG. 6). The sleeve 71 is in the lowermost position with the cantilever rod 75 above the hook 45. When the head 15 is to be removed the motor (not shown) is energized by a remotely-actuable switch (not shown). The actuation is carried out by personnel 82, remote from the reactor who enables a transmitter 84 which communicates with receiver 80 on the platform 67.

Figure 7:
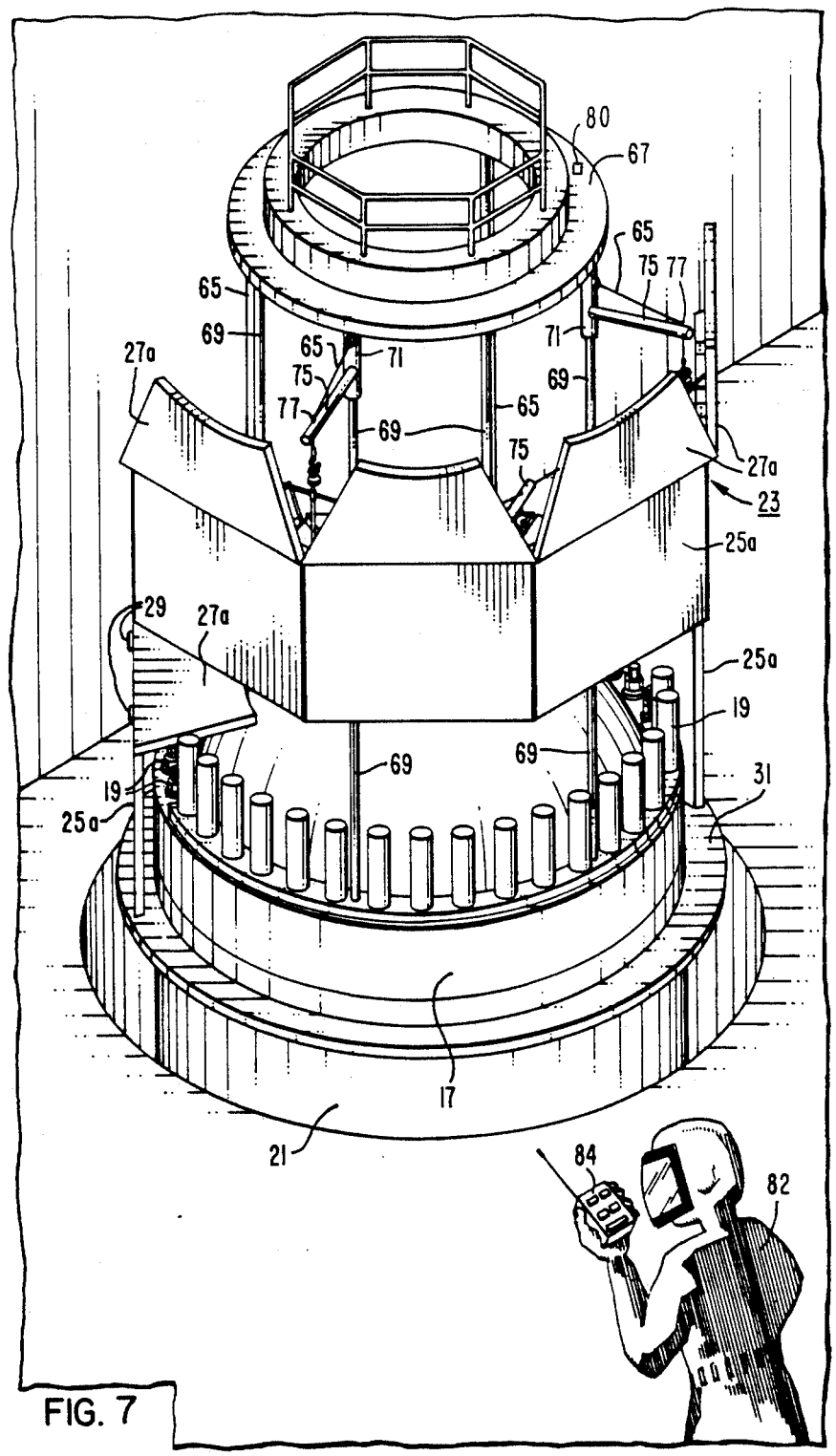
FIG. 7 is a fragmental view in isometric similar to FIG. 6 but with the head-shield insulator partly in the retracted position.

The cable 65, sleeve 71, cantilever bar 75, linkage bar 43, and cross bar 53 (FIG. 4) of each pair of sides 25a and panels 27a which are to be raised are pulled upwardly. Each cross bar 53 engages the lower surfaces of its associated panels 27a and pivots these panels to the retracted position as shown in dash-dot lines in FIG. 4. As each bar 43 is raised, its finger 47 engages the bottom of guide 55. As each bar continues to rise, it carries the associated frame sides 25a with it. Ultimately, the portion of the shield 23 which was raised is in the position shown in FIG. 7. The thermal shield 23 may be raised in separate sections and the tension studs 19 removed as indicated in FIG. 7. Alternatively, the thermal shield as a whole may be raised and then the studs may be removed. In either event, the head 15 is ultimately removed and the reactor 11 processed as required.

When the shield 23 is to be replaced after the head 15 has been secured to the body 13, the motor (not shown) is energized in the reverse direction. Each linkage 41 is then lowered. Initially, each cross bar 53 is in the position shown in dash-dot lines in FIG. 4 As cables 65 are lowered, the shields 23 are lowered until the lower edges of sides 25 engages flange 31. Once this downward movement is completed, each cross bar 53 engages the webs 83 of the members 61 pivoting the panels 27a to the shielding position.

While preferred embodiments of this invention have been disclosed herein, many modifications thereof are feasible. This invention is not to be restricted except insofar as is necessitated by the spirit of the prior art.

We claim:

1. A nuclear reactor including a vessel having a body and a removable head, a thermal insulating shield for said head, said sheild including a generally vertical frame of thermal insulation encircling said head, a plurality of panels of thermal insulation extending from said frame, and means, connected to said frame and to each said panel, for connecting each said panel pivotally near the top of said frame so that each said panel is pivotal on said frame between a closed position in which said panels extend over said head and a retracted position, the adjacent edges of said panels mating when said panels are in said closed position whereby in said closed position said panels provide substantially closed thermal insulation at least over a portion of said head and prevent removal or replacement of said head and when said panels are in said retracted position said panels are separated, and permit removal or replacement of said head, and remotely-actuable means, connected to said panels, cooperative with said pivotally-supporting means, for moving said panels between said closed position and said retracted position whereby access for removal of said head is obtainable without exposure of personnel to radioactivity.

2. The nuclear reactor of claim 1 wherein the frame is of generally polygonal transverse cross section and having a plurality of sides, a panel of the plurality of panels being connected by the pivotably-connecting means to said each side.

3. The nuclear reactor of claim 1 wherein the panel moving means includes a plurality of moving mechanisms, each mechanism being mounted between a pair of adjacent panels and being capable when actuated of moving both said panels.

4. The nuclear reactor of claim 1 wherein the moving means includes means, cooperative with the frame, for moving the frame between a lower position in which said frame shields the head thermally and an upper position in which said frame is removed from said head.

5. The nuclear reactor of claim 1 wherein the panels are generally horizontal in the closed position.

6. A nuclear reactor including a vessel having a body and a removable head, a thermal insulating shield for said head, said shield including a generally vertical frame of thermal insulation encircling said head, a plurality of panels of thermal insulation extending from said frame, and means connected to said frame and to each said panel for connecting each said panel pivotally, near the top of said frame so that each said panel is pivotal on said frame between a closed position and a retracted position, said panels mating over said head when said panels are in said closed position, whereby in said closed position, said panels provide substantially closed thermal insulation at least over a portion of said head and preclude access for removal or replacement of said head, and when said panels are in retracted position said panels are separated and afford access for removal or replacement of said head, a rod adjacent said frame, means, to be connected to said rod, for moving said rod relative to said frame between a first position and a second position, guide means connected to said frame for guiding said rod as it is moved between said first position and said second position, means, connected to said rod engageable with at least one of said panels, for moving said one panel between its closed position and its retracted position as said rod is moved between said first position and said secdon position, and means, connected to said one panel, engageable with said panel-moving means, for returning said one panel from said retracted position to said closed position when said rod is moveable from said second position to said first position.

7. The apparatus of claim 6 wherein the rod engages the frame at its lower end and extends at an angle to the frame and the guide means includes a plurality of U-shaped members extending from the frame and spaced vertically along the frame, said rod being guided by its engagement with the U-shaped members which function as cam surfaces.

8. The apparatus of claim 7 wherein the rod includes a finger at its lower end, said finger engaging the lower most U-shaped member as a stop when the rod is in the second position.

9. The apparatus of claim 6 wherein the rod at its upper end extends beyond the one panel and the panel-moving means includes a cross rod connected to the first-named rod just below the one panel and the panel-returning means includes cam means suspended from the one panel engageable by the cross rod for returning the one panel from the second position to the first position.

10. A nuclear reactor including a vessel having a body and a removable head, a thermal insulating shield for said head, said shield including a generally vertical frame of thermal insulation encircling said head, a plurality of panels of thermal insulation extending from said frame, and means connected to said frame and to each said panel for connecting each said panel pivotally, near the top of said frame so that each said panel is pivotal on said frame between a closed position and a retracted position, said panels mating over said head when said panels are in said closed position, whereby in said closed position, said panels provide substantially closed thermal insulation at least over a portion of said head and preclude access for removal or replacement of said head, and when said panels are in retracted position said panels are separated and afford access for replacement of said head, and means for moving each said panel between said closed position and said retracted position, the said moving means including an elongated member, movable generally vertically, upwardly and downwardly, extending from a point below said each panel to a point above said each panel in the closed position of said each panel, cam means, connected to said frame, cooperative with said elongated member for guiding said elongaated member in its generally vertical movement, means, connected to said elongated member, engageable with said each panel, for moving said each panel from its closed position to its retracted position on the upward generally vertical movement of said elongated member, cam means, connected to said each panel, cooperative with said panel-moving means, for returning said each panel from said retracted position to said closed position on the downward generally vertical movement of said elongated member, and remotely actuable means, to be connected to said elongated member, for moving said member generally vertically upwardly and generally vertically downwardly.

11. A nuclear reactor including a vessel having a body and a removable head, a one piece thermal insulating shield for said head, said shield including a one piece frame and a plurality of panels, each panel being connected to said frame by hinge means and being pivotal on the hinge means, between a closed position in which said panels make blocking access for removing or replacing said head and a retracted position affording access for removing or replacing said head, and means, connected to said frame, actuable to move said panels from said closed position to said retracted position.

12. The reactor of claim 11 including remotely operable means to be connected to the actuable means both, for actuating the actuable means to move said panels from the closed position to the retracted position and to raise the shield above the head.

13. The nuclear reactor of claim 11 wherein the panels are generally horizontal in the closed position.

* * * * *